(12) United States Patent
Dion

(10) Patent No.: US 8,503,924 B2
(45) Date of Patent: Aug. 6, 2013

(54) METHOD AND SYSTEM FOR EDUCATION COMPLIANCE AND COMPETENCY MANAGEMENT

(76) Inventor: Kenneth W. Dion, Austin, TX (US)

( * ) Notice: Subject to any disclaimer, the term of this patent is extended or adjusted under 35 U.S.C. 154(b) by 1065 days.

(21) Appl. No.: 11/821,405

(22) Filed: Jun. 22, 2007

(65) Prior Publication Data

US 2008/0318197 A1 Dec. 25, 2008

(51) Int. Cl.
*G09B 3/00* (2006.01)
(52) U.S. Cl.
USPC .................... 434/350; 434/322; 434/323
(58) Field of Classification Search
USPC .................... 434/322, 323, 350, 362, 336
See application file for complete search history.

(56) References Cited

U.S. PATENT DOCUMENTS

| | | | |
|---|---|---|---|
| 5,867,821 A | 2/1999 | Ballantyne et al. | |
| 6,002,768 A * | 12/1999 | Albanese et al. | 713/175 |
| 6,386,883 B2 | 5/2002 | Siefert | |
| 6,405,226 B1 | 6/2002 | Alpert et al. | |
| 6,496,681 B1 | 12/2002 | Linton | |
| 6,546,230 B1 | 4/2003 | Allison | |
| 6,606,480 B1 | 8/2003 | L'Allier et al. | |
| 6,633,742 B1 | 10/2003 | Turner et al. | |
| 6,652,283 B1 | 11/2003 | Van Schaack et al. | |
| 6,669,631 B2 | 12/2003 | Norris et al. | |
| 6,700,971 B1 | 3/2004 | Cohen et al. | |
| 6,827,578 B2 | 12/2004 | Krebs et al. | |
| 6,859,523 B1 | 2/2005 | Jilk et al. | |
| 6,885,844 B2 | 4/2005 | Roschelle et al. | |
| 6,905,340 B2 | 6/2005 | Stansvik | |
| 6,918,771 B2 | 7/2005 | Arington et al. | |
| 6,921,268 B2 | 7/2005 | Bruno et al. | |
| 6,932,268 B1 | 8/2005 | McCoy et al. | |
| 6,938,048 B1 | 8/2005 | Jilk et al. | |
| 6,947,914 B2 | 9/2005 | Bertrand et al. | |
| 6,987,945 B2 | 1/2006 | Corn et al. | |
| 6,988,138 B1 | 1/2006 | Alcorn et al. | |
| 6,988,239 B2 | 1/2006 | Womble et al. | |
| 6,997,717 B2 | 2/2006 | Kienzie et al. | |
| 7,013,325 B1 | 3/2006 | Vivian et al. | |
| 7,014,467 B2 | 3/2006 | Krebs et al. | |
| 7,050,753 B2 | 5/2006 | Knutson | |
| 7,054,848 B1 | 5/2006 | Lannert et al. | |

(Continued)

OTHER PUBLICATIONS

U.S. Patent and Trademark Office, "Office Action" for U.S. Appl. No. 11/542,839 mailed Oct. 17, 2008.

(Continued)

*Primary Examiner* — Bruk Gebremichael
(74) *Attorney, Agent, or Firm* — Meyertons, Hood, Kivlin, Kowert & Goetzel, P.C.; Eric B. Meyertons

(57) ABSTRACT

The present invention discloses a method, system, and computer product for complete and comprehensive education competency and compliance management method and system for institutions and organizations. The embodiments of the present invention disclose a method whereby a sponsoring organization or institution need only provide secure access to the hosting organizations content delivery for ease of capture, organization of and reporting on the entire educational program. The sponsoring organization is able to direct employees to educational activities required to be completed based on the compliance requirements for their role in the organization. The hosting organization remains content independent to objectively provide the "best value" content for sponsoring organizations. Sponsoring organizations can purchase content from content partners or other third parties for loading the on-line and off-line education competency and compliance management servers, generate reports for internal use and accrediting bodies updates.

21 Claims, 13 Drawing Sheets

U.S. PATENT DOCUMENTS

| | | | |
|---|---|---|---|
| 7,082,418 B2 | 7/2006 | Levy et al. | |
| 7,110,989 B2 | 9/2006 | Iemoto et al. | |
| 7,155,400 B1 | 12/2006 | Jilk et al. | |
| 7,156,665 B1 | 1/2007 | O'Connor et al. | |
| 7,171,155 B2 | 1/2007 | Kamikawa et al. | |
| 7,333,951 B1 | 2/2008 | Corning et al. | |
| 7,386,467 B2 | 6/2008 | Eitel et al. | |
| 7,680,854 B2 | 3/2010 | Hyder et al. | |
| 7,702,532 B2 | 4/2010 | Vigil | |
| 7,783,027 B2 | 8/2010 | Shinpuku et al. | |
| 7,805,107 B2 | 9/2010 | Shaver | |
| 7,917,417 B2 | 3/2011 | Dion | |
| 2002/0010768 A1* | 1/2002 | Marks et al. | 709/223 |
| 2002/0019765 A1 | 2/2002 | Mann et al. | |
| 2002/0055089 A1* | 5/2002 | Scheirer | 434/350 |
| 2002/0127530 A1* | 9/2002 | Weakly | 434/350 |
| 2002/0128892 A1 | 9/2002 | Farenden | |
| 2002/0128893 A1 | 9/2002 | Farenden | |
| 2002/0128894 A1 | 9/2002 | Farenden | |
| 2002/0156668 A1 | 10/2002 | Morrow et al. | |
| 2002/0173999 A1 | 11/2002 | Griffor et al. | |
| 2002/0177109 A1* | 11/2002 | Robinson et al. | 434/118 |
| 2002/0184085 A1 | 12/2002 | Lindia et al. | |
| 2003/0077560 A1* | 4/2003 | Colby | 434/322 |
| 2003/0101091 A1 | 5/2003 | Levin et al. | |
| 2003/0113697 A1* | 6/2003 | Plescia | 434/322 |
| 2003/0115094 A1 | 6/2003 | Ammerman et al. | |
| 2003/0134261 A1* | 7/2003 | Jennen et al. | 434/354 |
| 2003/0152904 A1* | 8/2003 | Doty, Jr. | 434/350 |
| 2003/0187723 A1 | 10/2003 | Hadden et al. | |
| 2003/0187725 A1 | 10/2003 | Jotkowitz | |
| 2003/0190590 A1 | 10/2003 | Lumsden et al. | |
| 2003/0207245 A1* | 11/2003 | Parker | 434/350 |
| 2003/0208393 A1 | 11/2003 | Younger | |
| 2003/0211447 A1 | 11/2003 | Diesel et al. | |
| 2003/0229529 A1 | 12/2003 | Mui et al. | |
| 2003/0236796 A1* | 12/2003 | Easter et al. | 707/104.1 |
| 2004/0002039 A1* | 1/2004 | Draper et al. | 434/118 |
| 2004/0059617 A1 | 3/2004 | McGovern | |
| 2004/0110119 A1 | 6/2004 | Riconda et al. | |
| 2004/0128188 A1 | 7/2004 | Leither et al. | |
| 2004/0138944 A1 | 7/2004 | Whitacre et al. | |
| 2004/0139053 A1* | 7/2004 | Haunschild | 707/1 |
| 2004/0143489 A1 | 7/2004 | Garman | |
| 2004/0153509 A1* | 8/2004 | Alcorn et al. | 709/205 |
| 2004/0172305 A1 | 9/2004 | Sorensen et al. | |
| 2004/0191752 A1 | 9/2004 | Fry | |
| 2004/0215503 A1 | 10/2004 | Allpress et al. | |
| 2004/0219492 A1 | 11/2004 | Morariu et al. | |
| 2004/0243458 A1 | 12/2004 | Barkan | |
| 2005/0015309 A1* | 1/2005 | Fracek et al. | 705/26 |
| 2005/0086296 A1 | 4/2005 | Chi et al. | |
| 2005/0091067 A1 | 4/2005 | Johnson | |
| 2005/0123891 A1* | 6/2005 | Bresciani | 434/322 |
| 2005/0192901 A1 | 9/2005 | McCoy et al. | |
| 2005/0202391 A1* | 9/2005 | Allen et al. | 434/362 |
| 2006/0026179 A1 | 2/2006 | Brown et al. | |
| 2006/0026213 A1 | 2/2006 | Yaskin et al. | |
| 2006/0078856 A1* | 4/2006 | Kellman | 434/118 |
| 2006/0078863 A1* | 4/2006 | Coleman et al. | 434/322 |
| 2006/0105315 A1* | 5/2006 | Shaver | 434/362 |
| 2006/0168233 A1 | 7/2006 | Alcorn et al. | |
| 2006/0229896 A1 | 10/2006 | Rosen et al. | |
| 2006/0256953 A1 | 11/2006 | Pulaski et al. | |
| 2006/0286536 A1* | 12/2006 | Mohler et al. | 434/350 |
| 2007/0100829 A1* | 5/2007 | Allen et al. | 707/9 |
| 2007/0122790 A1 | 5/2007 | Sperle et al. | |
| 2007/0192157 A1 | 8/2007 | Gooch | |
| 2007/0208572 A1 | 9/2007 | Habichler et al. | |
| 2007/0233547 A1 | 10/2007 | Younger et al. | |
| 2008/0040193 A1 | 2/2008 | Dion | |
| 2008/0114608 A1* | 5/2008 | Bastien | 705/1 |
| 2008/0166693 A1* | 7/2008 | Gifford et al. | 434/322 |
| 2008/0213741 A1* | 9/2008 | Redd et al. | 434/365 |
| 2008/0228747 A1* | 9/2008 | Thrall et al. | 707/5 |
| 2008/0293030 A1* | 11/2008 | Hixon et al. | 434/322 |
| 2009/0017435 A1* | 1/2009 | Simmons | 434/362 |
| 2009/0089154 A1 | 4/2009 | Dion | |
| 2009/0311657 A1* | 12/2009 | Dodelson et al. | 434/350 |
| 2010/0100408 A1 | 4/2010 | Dion | |

OTHER PUBLICATIONS

U.S. Patent and Trademark Office, "Final Office Action" for U.S. Appl. No. 11/542,839 mailed Mar. 13, 2009.

U.S. Patent and Trademark Office, "Office Action" for U.S. Appl. No. 11/542,839 mailed Jul. 28, 2009.

U.S. Patent and Trademark Office, "Final Office Action" for U.S. Appl. No. 11/542,839 mailed May 18, 2010.

U.S. Patent and Trademark Office, "Notice of Allowance" for U.S. Appl. No. 11/542,839 mailed Dec. 22, 2010.

U.S. Patent and Trademark Office, "Office Action" for U.S. Appl. No. 11/712,114 mailed Sep. 22, 2010.

U.S. Patent and Trademark Office, "Final Office Action" for U.S. Appl. No. 11/712,114 mailed Mar. 18, 2011.

U.S. Patent and Trademark Office, "Office Action" for U.S. Appl. No. 11/888,159 mailed Feb. 18, 2011.

U.S. Patent and Trademark Office, "Final Office Action" for U.S. Appl. No. 11/888,159 mailed Sep. 9, 2011.

U.S. Patent and Trademark Office, "Office Action" for U.S. Appl. No. 12/141,185 mailed Jun. 9, 2011.

U.S. Patent and Trademark Office, "Office Action" for U.S. Appl. No. 12/255,143 mailed May 25, 2011.

U.S. Patent and Trademark Office, "Final Office Action" for U.S. Appl. No. 12/141,185 mailed Feb. 24, 2012.

U.S. Patent and Trademark Office, "Office Action" for U.S. Appl. No. 12/141,185 mailed Jul. 20, 2012.

U.S. Patent and Trademark Office, "Final Office Action" for U.S. Appl. No. 12/255,143 mailed May 14, 2012.

* cited by examiner

| Home Logout Help | Navigation: Personal Training Plan | | | |
|---|---|---|---|---|
| Personal Tools | 151  153 | | 155  157 | (Edit Instructions) |
| My Training Plan | | | | |
| My Transcript | Personal Training Plan For | | | |
| My Courses In-progress | | 159 | | |
| Event Calendar | Required Course Name | Expires | Status | Actions |
| My Events | Chemical Safety | 02/02/2007 | Expired | Online Course |
| My Credentials | Customer Service for Healthcare Employees | 08/10/2006 | Expired | Online Course |
| My Reports | Electrical Safety | " | Need to Complete | Online Course |
| My Staff | Fire Safety | 06/01/2006 | Expired | Online Course |
| My Personal Information | Infection Control | " | Need to Complete | Online Course |
| My Email Address | Sprains and Strains | 01/20/2004 | Expired | Online Course |
| Change Password | TB Precautions | " | Expired | Online Course |
| CoursesTestsandSurveys | Required Test Name | Expires | Status | Actions |
| Find a Course | Adolescent Sexuality and Childbearing | | Need to Complete | Online Test |
| Find an Event | Advance Directives: Obstacles to End-of-Life Planning Persist | | Need to Complete | Online Test |
| Document Library | Anxiety: Emotional and Physical Discomfort | | Need to Complete | Online Test |
| Reporting and Analysis | Balance and Hearing: At Risk From Drugs | | Need to Complete | Online Test |
| Manage Users / Profiles | Required Competency Name | Expires | Status | Actions |
| Manage Courses | Start an IV | | Need to Complete | Self Assess |
| Manage Tests | Required License Name | Expires | Status | Actions |
| Manage Competencies | Registered Nurse | | Need to Complete | My Licenses |
| Manage Surveys | Required Certification Name | Expires | Status | Actions |
| Manage Documents | Certified Emergency Room Nurse | 02/01/2007 | Expired | My Certifications |
| Manage Images | | | | |
| Manage Events/ Inservice | | | | |
| Manage Local Settings | | | | |
| Manage Organizations | | | | |
| System Support Options | | | | |

Course List

Navigation: Manage Users and Profiles > User List > User Profiles Update > Course List — 177, 153

Find Course — 179, 181

- Course Name:
- Course Category:
- Course Subject:
- Course Format:
- Course/Product ID:

173, 183 — 157 195 185

186 187 189 191 193

*1 2 3 4 5 6 7 8 9 A B C D E F G H I J K L M N O P Q R S T U V W X Y Z

<First <Prev    Next> Last>

| Course Name | Subject | Format | ID | Actions |
|---|---|---|---|---|
| A Case Manager's Guide to Com (More ...) | Utilization Review/Case Management | Online Courses and Exams | NW2220 | Start |
| A Case Manager's Guide to Com (More ...) | Utilization Review/Case Management | Book Exams | NW2220 | Start |
| A Nurse's Guide to AIDS and HIV | Clinical Care | Online Courses and Exams | NW3170 | Start |
| A Nurse's Guide to AIDS and HIV | Clinical Care | Book Exams | NW3170 | Start |
| A Nurse's Guide to Diabetes Care | Clinical Care | Online Courses and Exams | NW2300 | Start |
| A Nurse's Guide to Diabetes Care | Clinical Care | Book Exams | NW2300 | Start |
| A Nurse's Guide to Discharge Planning | Utilization Review/Case Management | Online Courses and Exams | NW2250 | Start |
| A Nurse's Guide to Discharge Planning | Utilization Review/Case Management | Book Exams | NW2250 | Start |
| A Nurse's Guide to Pain Management | JCAHO Advanced Standards | Online Courses and Exams | NW0150 | Start |
| A Nurse's Guide to Pain Management | Pain Management | Online Courses and Exams | NW0150 | Start |
| A Nurse's Guide to Pain Management | Pain Management | Book Exams | NW0150 | Start |
| Acid Base Balance: Metabolic (More ...) | General Education | Video Course Exams | CM0852.3 | Start |
| Acid Base Balance: Respirato (More ...) | General Education | Video Course Exams | CM0852.2 | Start |
| Acid Base Balance: Ups and Downs of pH | General Education | Video Course Exams | CM0852.1 | Start |
| Adolescent Drinking: The Sobe (More ...) | Substance Abuse | Online Courses and Exams | NW0261A | Start |
| Adult Hearing Loss | Clinical Care | Online Courses and Exams | NW0199A | Start |

Fig 5a

Add Course

Navigation: Manage Courses > Course List > Course Add

To add a new course, complete the required information below and click "Add" to save
Required fields are highlighted and flagged with a red asterisk (*)

(Edit Instructions)

Course Name:
Course Subtitle:
Course Category:
Course Subject:
Course Description:
Course Objectives:
Course Instructions:
Course/Product ID:
Course Version:
Credit Hours:
Contact Hours:
Pre-Course Test:
Post Course Test:
Survey:
Minimum User Type:
Allow Testing Out?
Test Out Score:
Course View Before Test?
Show to Users?
Compliance Frequency:

Organization and Facility Courses
Annual Competencies

Once Only or N/A

Add   Cancel
Add   Cancel

Fig 5c

Chemical Safety —— 221

1. Material Safety Data Sheets (MSDS) contain information on:
   - a). Incident reports
   - b). How to make chemicals
   - c). How to mix chemicals safely
   - d). Emergency measures to take if coming in contact with a hazardous chemical 2. A hazardous chemical is a substance that can explode, burn or release dangerous vapors into the air. —— 223
   - a). True
   - b). False 3. In your facility, specific training regarding hazardous substances should be provided for employees. —— 225
   - a). True
   - b). False 4. Employee information and training regarding hazardous chemicals:
   - a). Is for supervisors only.
   - b). Includes how to handle hazardous chemicals.
   - c). Is done on the employee's first year anniversary.
   - d). Is not needed if there are MSDS in the work area.

5. Labels on hazardous chemicals leaving the workplace should be destroyed.
   - a). True
   - b). False 6. MSDS are developed by:
   - a). Your employer
   - b). The federal government
   - c). Chemical companies
   - d). The Environmental Protection Agency

[Score Test] —— 227

Navigation: Reports > Compliance Reports > Contents

Course Compliance — 241 243 245

List the compliance status for courses based on user profiles.

Please select any optional fields for your report and click 'Submit'. — 249

Report Contents

Default Report Fields: — 251 253

User Name
Course
Test Pass Date
Expire Date
Taken?
Expired?
Passed?
Score

— 255 257

☐ Badge Number
☐ Hire Date
☐ Position
☐ Department

Optional Report Fields:

— 259

— 249l

Submit

Submit

— 247

— 151 153

Home  Logout  Help

Personal Tools
My Training Plan
My Transcript
My Courses In-progress
Event Calendar
My Events
My Credentials
My Reports
My Staff
My Personal Information
My Email Address
Change Password
CoursesTestsandSurveys
Find a Course
Find an Event
Document Library
Reporting and Analysis
Manage Users / Profiles
Manage Courses
Manage Tests
Manage Competencies
Manage Surveys
Manage Documents
Manage Images
Manage Events/ Inservice
Manage Local Settings
Manage Organizations
System Support Options

METHOD AND SYSTEM FOR EDUCATION COMPLIANCE AND COMPETENCY MANAGEMENT

FEDERALLY SPONSORED RESEARCH

N/A

SEQUENCE LISTING OR PROGRAM

N/A

BACKGROUND

1. Technical Field of Invention

This invention relates to networks exchanging information between providers and subscribers and more particularly to such a network for content delivery, manipulating, testing, scoring, and storing for organizational competency compliance management.

2. Background of the Invention

Although most people strive to do their best performance for their job day in and day out institutions and organizations have found over the years that there must be continuous monitoring and checking of individuals within the institutions and organizations for day to day knowledge and performance. Additionally in the case of health care; a very complicated area, most consumers cannot tell what level of quality of care they are receiving until after the fact. In response to the need of knowing how well informed employees of institutions and organizations are, if and how current employees are in their techniques accreditation agencies have been established to promulgate requirements that will measure, qualify, and provide a basis for recognition of organizations and institutions for meeting industry standards. These requirements are both basic and dynamic as employees must be kept current in skills to assure optimal performance at an affordable price. Other fields as varied as law, automotive, and even auto racing have similar requirements to assure safe and consistent performance. The term "continuing education" is a typically used term to describe how employees can be kept current in an organization or institution. Also the term "life long learning" describes a life style many professionals feel is the proper way to serve their profession. Many methods and system have been proposed and are working within organizations and institutions at present. Classically courses were held within an organization or institution and supplemented with local learning institutions. The costs of conducting such classes and tuition fees have evolved to on line content delivery with standardized courses. In U.S. Pat. No. 5,867,821 Ballantyne et al. dtd. Feb. 2, 1999 disclose a "Method and apparatus for electronically accessing and distributing personal health care information and services in hospitals and homes". In this disclosure a method and apparatus is used for the distribution and administration of medical services, entertainment services, electronic medical records, educational information, etc. to a patient's individual electronic patient care station (PCS) interconnected to a master library (ML) which stores data in digital compressed format, through a local medical information network. The patient/medical personnel interact with this medical information network through the unique PCS and receives the requested service or data from the master library. The data is then displayed either on the associated television set or video monitor or through wireless/IR communications to a peripheral personal data assistant (pen based computer technology) the data for text, audio, and video information is all compressed digitally to facilitate distribution and only decompressed at the final stage before viewing/interaction. While Ballantyne et al. may have a system for remotely accessing and distributing health care records the system as described will not be suitable for educational compliance management (no testing/retention capability for certification compliance) and modifications to the '821 patent to implement such functionality would require modifications to the programming structure and functionality removing the functionality that was claimed. Due to the extensive nature of modifications and lack of intention in the specification there would be no motivation to design such extensions. In U.S. Pat. No. 6,546,230 dtd. Apr. 8, 2003 Allison discloses a "Method and apparatus for skills assessment and online training". In this disclosure a technique is disclosed for testing and training health care professionals. Competency tests are stored on machine readable media and transmitted via network connections to remote provider systems, such as workstations or diagnostic systems. A health care professional can take a competency test on a particular topic and input his/her responses at the remote provider system. The health care professional's responses are evaluated, and an assessment of his/her skills displayed at the provider system. The assessment particularly points out those areas, if any, where the health care professional's knowledge is deficient. If the health care professional has any areas which need improvement, a list of relevant courses is also displayed at the provider system. The health care professional may then select a desired course from the user interface. The machine readable media maintains a record of the health care professional's assessment as well as a list of completed courses. This information may then be provided to a licensing entity for credit. While Allison has disclosed a system for testing and training health care professionals with evaluation and feedback this represents only a small portion of the requirements of a comprehensive educational compliance management system for organizations and institutions. The additional functions necessary for a seamless comprehensive implementation of an educational compliance management system requires additional breath (local content, surveys, and reporting) additionally, adaptation by sponsoring institutions or organizations with comprehensive-role based summary reporting, update alerts, and dynamic assessment adaptability. Without these functions users of the '230 patent system will be forced to pre-configure material and translate output information and scores into a reporting engine. The intent to combine these functions into the '230 would require a complete format and program restructure and rewrite. In U.S. Pat. No. 6,988,138 Alcorn et al disclose an "Internet-based education support system and methods". This disclosure discusses a system and methods for implementing education online by providing institutions with the means for allowing the creation of courses to be taken by students online, the courses including assignments, announcements, course materials, chat and whiteboard facilities, and the like, all of which are available to the students over a network such as the Internet as described by Alcom et al. include various levels of functionality that are provided through a three-tiered licensing program that suits the needs of the institution offering the program. A general purpose system and method for content delivery, adaptation, and testing is described by Alcom et al. with no realistic provisions for system management and certification compliance. Review of the drawings and discussions contained in the '138 patent indicate that implementing capabilities for system management, role based reporting, update alerts, and certification compliance would require a new programming structure and data field reconstruction which would modify the intent of the disclosed system beyond its intended purpose as there was no such intent indicated in the disclosure. Many of the systems in discussion are content deliverers that have adopted network testing. While this is not prohibited by law a single supplier to an organization or institution is seldom the best value in both content and delivery. In USPTO publication #20050086296 Chi et al. disclose a "Content system and associated methods". In this disclosure a method and system are disclosed for providing data files to a community of users. The data files relate to a plurality of courses. Each user is associated with one or more of the courses. The system includes client devices operated by the users and a server system in communication with the client devices over a network. The server system provides to the client devices access to data files relating to courses with which the users are associated. The server system also includes a content system for storing content items from users. The content items in the content system are selectable by users for inclusion in one or more of the plurality of data files. While Chi et al. may be able to deliver content with testing these are only the rudimentary functions of a comprehensive educational compliance management system and such functionality (requirements, compliance, licensing, certifications, surveys, role based reporting, and skills) are not an intention or purpose of the '296 publication. Further the general nature of the '296 publication would preclude combining the functions (resource intensive and no common modules) or a comprehensive educational compliance management system for institutions or organizations.

While many excellent methods and systems have been implemented for content delivery and testing there remains a need for complete and comprehensive continuing education competency and compliance management system. Such a system would provide ease of use to an institution or organization in content delivery, source flexibility, testing, tracking, and reporting that is compliant to the appropriate accreditation agencies and remain content independent to assure the institution or organization the best value.

SUMMARY OF THE INVENTION

The present invention discloses a method, system, and computer product for complete and comprehensive education competency and compliance management method and system for institutions and organizations. In the context of the present invention the term education is comprised of the following educational areas:

1. Continuing education (CE) is defined as education for which continuing education credits are offered. These credits are in many cases required for an individual to maintain a license or certification. The present system will award these if a course loaded on the system is approved for continuing education and will allow the individual to print a certificate of completion if they successfully pass the course (by taking the test) and complete the required post course survey. The present systems will also track and report to accrediting bodies on CE credits awarded to an individual for the individual and organization.

2. Mandatory education courses are those courses and associated tests that must be completed periodically. The organization is required to provide these courses to individuals to maintain their accreditation with accreditation bodies such as the Joint Commission Accrediting Healthcare Organizations. If this requirement is not met, the hospital cannot receive Medicare and Medicaid reimbursement which is a substantial portion of many healthcare organizations income. CE credit is not awarded for these courses. The present system prompts individuals to complete this education and tracks and reports on status for the organization.

3. Competences are tracked in the present system. Many organizations are required to provide the proof these competences are maintained to establish or continue their accreditation with accreditation bodies such at the Joint Commission Accrediting Healthcare Organizations. If this requirement is not met, the hospital cannot receive Medicare and Medicaid reimbursement. The responsibility for obtaining and retaining the license through CE (#1 above) belongs to the individual such as a nurse. An employing hospital is responsible for assuring all professionals requiring licenses or specific credentials are qualified and up to date. The present system provides this tracking and reporting function.

The embodiments of the present invention disclose a method whereby a sponsoring organization or institution need only provide secure access to the hosting organizations content delivery for ease of capture, organization of and reporting on the entire educational program. The sponsoring organization is able to direct employees to educational activities required to be completed based on the compliance requirements for their role in the organization. The hosting organization remains content independent to objectively provide the "best value" content for sponsoring organizations. Sponsoring organizations can purchase content from content partners or other third parties for loading on the education competency and compliance management servers. Additionally, sponsoring organizations can create their own content and load the modules or courses onto the education competency and compliance management servers. Further, sponsoring organizations administrators can create from the education competency and compliance management interface for local or internet links to content residing on other systems. In the present invention the term content refers to educational subject matter content that can be completed by students on-line (at the computer input device) or off-line education (example class room or self-study book). The robustness of the education competency and compliance management facilities most any media delivery to include text, video, and voice with the following capabilities;

a. storing independent content courses and modules,
b. affording secure access through sponsoring organization's facilities for curriculum creation and standardization,
c. providing functional flexibility through assignment of varying levels of capabilities to users within an organization theses categories include; providers, instructors, users, managers/supervisors, organization administrators, and system administrators,
d. transmitting securely to sponsoring organizations education competency and compliance management content,
e. facilitating modification by approved individuals of courses and modules,
f. facilitating student content access both on-line and off-line education for organizational compliance and career development,
g. facilitating student access scheduling by a simple to use calendar for real world adjustments,
h. evaluating student progress and performance with the ability to perform practice testing of course knowledge before actual testing,
i. tracking of licensing, certification, and skills expiration dates, j. alerting students and administrators of impending expiration of licensing, certification, and skills expirations,
k. facilitating manipulation of test format and presentation by approved individuals within an organization to avoid inaccurate measurements by student answer memorization, specifically, questions can be randomized, remediated, and the administrator can select to show the student the score or not show the score depending on the specific test requirements,
l. archiving student proficiency of course testing,
m. providing test performance feedback to students for improvement and advancement,
n. providing test performance feedback to sponsoring organizations for assessment and improvement planning,
o. providing test performance reports that are integral to the education competency and compliance management (avoiding third party software complications) to certifying or accreditation organizations.

BRIEF DESCRIPTION OF THE DRAWINGS

FIG. 3b shows an interface screen for a user specific personal training plan utilizing an education competency and compliance management system.

FIG. 5a shows an interface screen for course selection with an education competency and compliance management system.

FIG. 5c shows a course add interface screen.

FIG. 7 shows an interface screen with a course testing module as part of an education competency and compliance management system.

FIG. 9 shows an interface screen with a report selection format as part of an education competency and compliance management system.

DETAILED DESCRIPTION OF THE DRAWINGS

Figure 1:
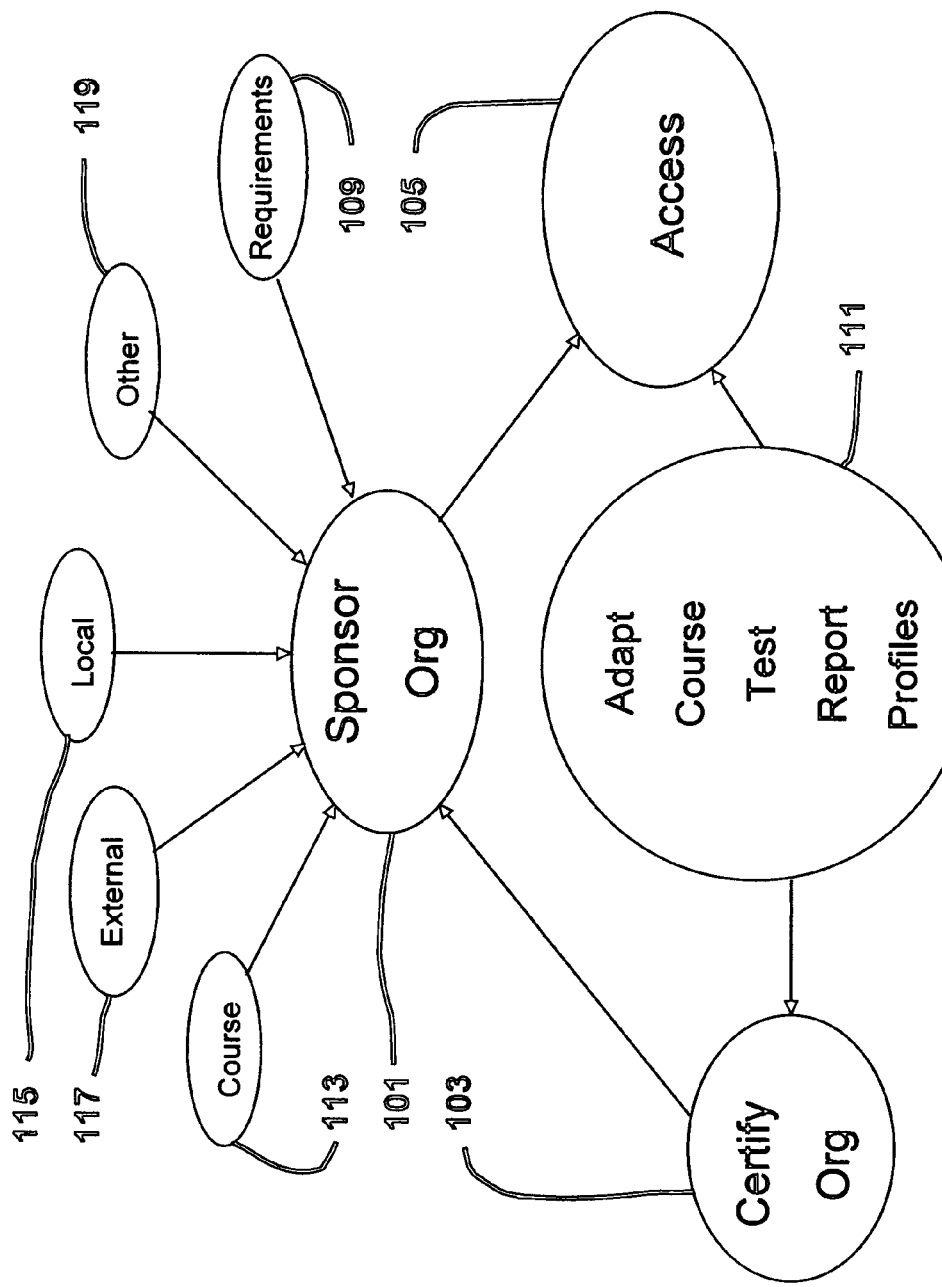
FIG. 1 shows a functional representation of an education competency and compliance management system.

FIG. 1 shows a functional representation of an education competency and compliance management system. A complete and comprehensive education competency and compliance management method and system for institutions and organizations is centered around a sponsoring organization 101. A typical organization 101 using this method and system is characterized by having multiple staff members at various levels of functionality that are required to be trained, maintain proficiencies, assimilate new skills, be able to document the processes to assure these procedures, and submit compliance reports to accreditation agencies or certifying organizations. The organization 101 will base their education competency and compliance management system on such as a certifying organization 103. An organization 103 can be a recognized group, a government agency (state, federal, local, etc.) or a collective non-profit; there can be multiple organizations 103 that an organization 101 desires to achieve and maintain accreditation or certification with. Organization 101 will typically facilitate access 105 to students and staff members that is selectable from content suppliers and employees consisting of many varied levels of functionality and organizational roles to be completed both on-line and off-line education as appropriate. Organization 101 can generate their own content or access content from an external course 113 supplier. Also an organization 101 can access external 117 for such as supporting materials, articles, and documents. Additionally, organization 101 can access local 115 content to satisfy specific regional and organizational unique requirements. Additionally, organization 101 can access other 119 content for additional materials such as surveys, training videos, seminars, etc. Additionally, requirements 109 are based on agreements with such as organization 103, local needs, and requirements. Organization 101 can assign multiple (administrators can define access appropriate to their organization or institution) different levels of access and control to employees. These levels are such as: providers, instructors, users, managers/supervisors, organization administrators, and system administrators. Assigning different levels of access allow organizations to limit access to specific functions through level of access. For example while students or users will be supplied test results from a test, an organization will typically only allow approved individuals such as administrators, managers, and supervisors access to test results in non-summary form. Additionally, course content, additions, deletions, and modification of are usually limited to organization approved individual such as administrators, managers, and supervisors. Typically providers only deliver content and have no other system privileges, instructors follow existing course content and administer tests, users are typically students with the ability to view, schedule, test, and view results, managers/supervisors are typically also students with the ability to implement a collection of functions 111. The high level functions 111 allow users with access to adapt material, view courses, surveys, schedule learning, reviewing, testing, viewing results and additionally they can assign profiles, author reports, establish requirements and manipulate content for students that they supervise, organization administrators oversee the implementation of the education competency and compliance management operation and review performance, set and adjust goals, generate compliance reports, and interface to organization 103 on behalf of organization 101, and system administrators oversee local operation and interface to the provider of system functionality.

Figure 2:
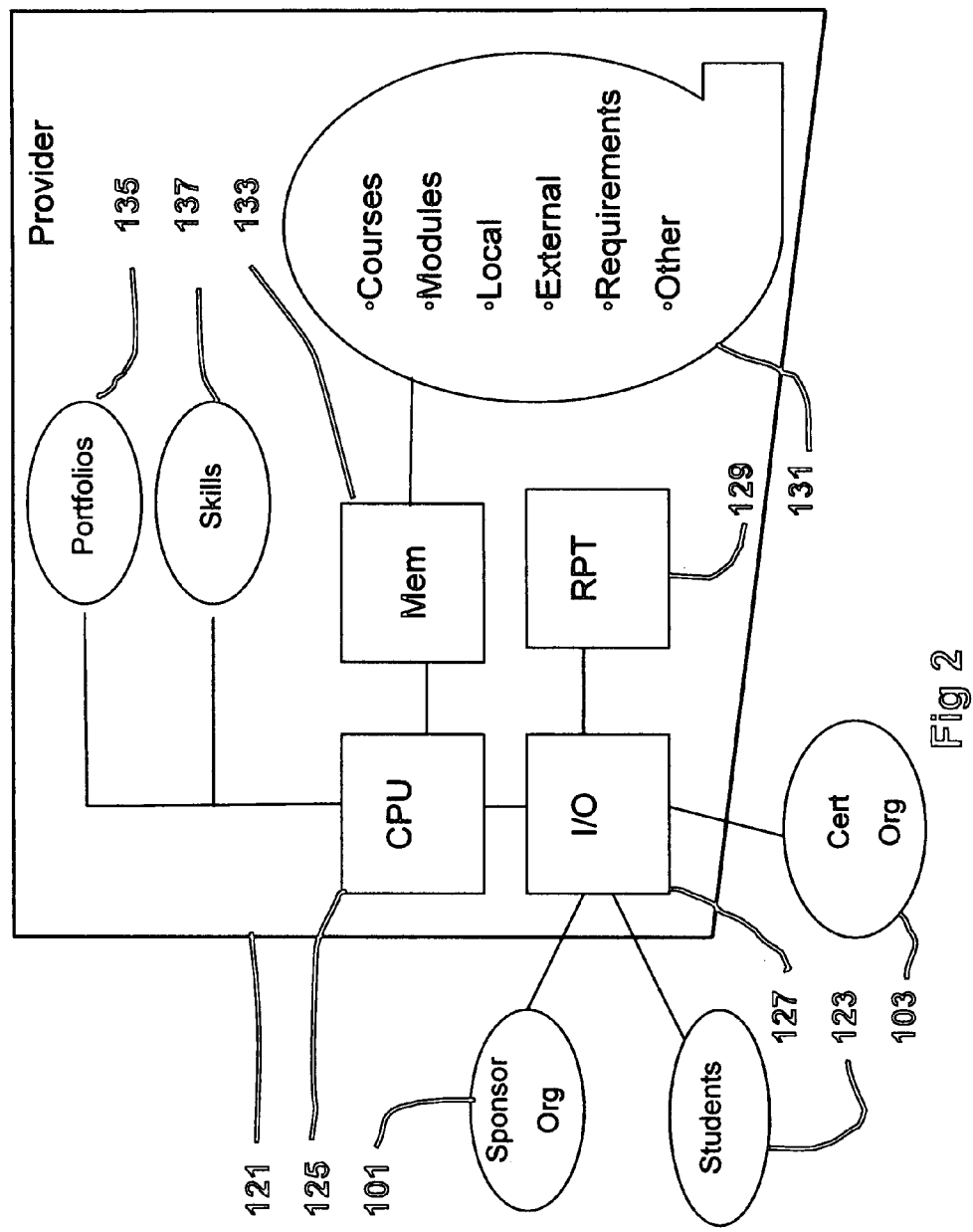
FIG. 2 shows a block diagram of an education competency and compliance management system.

FIG. 2 shows a block diagram of an education competency and compliance management system. This block diagram has the processing functions of the education competency and compliance management system enclosed in a provider 121 enclosure. The provider 121 is typically at a remote location that is connected to the sponsoring organization 101 and a students 123. Additionally, certifying organizations 103 are typically permitted remote access for quality, review, and certification purposes. These connections for access to the provider processing functions is typically over a network such as the internet with the organizations 101 and 103 and students 123 providing their own browser enabled access devices. The provider 121 facilitates access to authorized remote users through a system I/O 127 port. The bandwidth and privileges associated with remote users are determined with the set up assignments of the organization 101. Although the students 123 interface directly to I/O 127 the system access privileges are governed by the setup and control rules of the sponsoring organization 101. The I/O 127 access a provider CPU 125 for data calculations, content manipulation, loading, and test scoring. The CPU 125 will utilize a memory 133 for extended calculations, storage, and other data operations. A storage function is represented by a disc 131 where long term storage is kept for access, manipulation, and archiving. Within disc 131 courses (all content is independent from provider 121) that are purchased and selected by the sponsoring organization 101 are stored. Also within disc 131 are modules that are created, purchased, or selected by organization 101 are stored. Also within disc 131 are modules with local specific information questions created or selected by organization are stored. Also within disc 131 are external content that are created, purchased, or selected by organization 101 are stored. This external content can be text, video, audio, presentations, or any material that will aide in student/staff understanding and retention of operational and task related information. Also within disc 131 are requirements that are typically promulgated by certifying organization 103 and additionally state, local, federal, and international government agencies. These requirements stored on disc 131 are kept current to assure the collection of information represented by these courses, modules, local, external, requirements, and other contribute to a series of courses and tests that inform students and accurately measure the students' ability comprehend the information and perform appointed tasks. The organization 101 establishes through access assignment which staff will be organization approved individuals allowed to add to, delete, modify, and adapt course content and testing to keep an organization improving and growing through improved task performance. Also interfacing to I/O 127 is a report engine 129. Report engine 129 will, through a simple computer device screen interface configure the report required by the individual, staff, student, or organization and deliver the report as specified in the options on the interface screen. The provider 121 may also provide access to an organization 101*a* collection of portfolios 135 and skills 137 to simplify compliance reporting and report completeness.

Figure 3A:
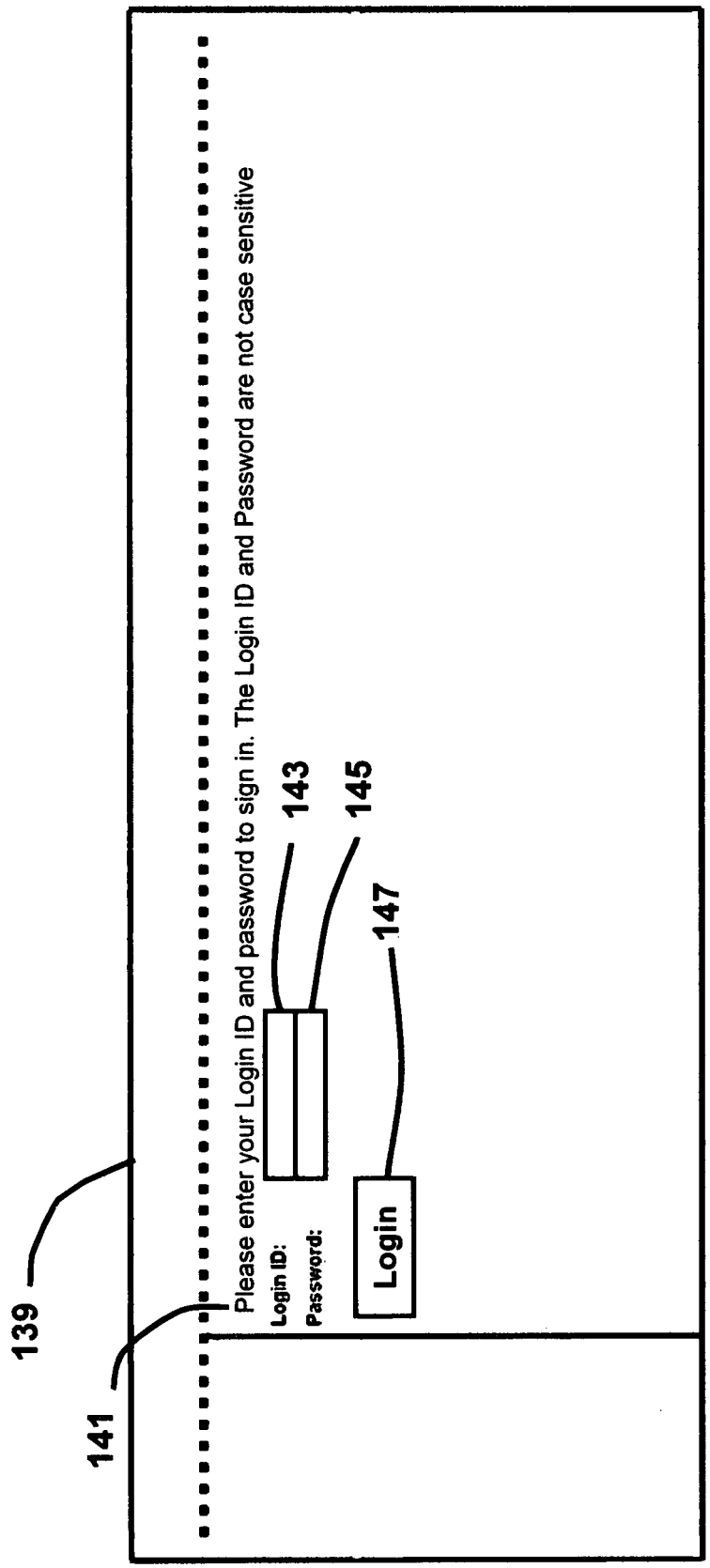
FIG. 3a shows an initial log interface screen for authorized user.

FIG. 3*a* shows an initial log interface screen for authorized user. A computer program product delivered to users is represented by an interface screen 139 which facilitates a user's log in to, the FIG. 2, provider 121 processor functions from the organization 101 connected local network. The system administrator has initial login ID and password assigned to organization users. Additionally, system privileges for specific types of access to organization 101 approved individuals (by organizational role) is also assigned by sponsoring organization's system administrator with coordination with provider 121 system administrator. Returning to FIG. 3*a*, a user when approved by the sponsoring organization and assigned a login ID and password the user will enter login ID into a text box 143 (making note of instructions in an information line 141). A user will then enter the assigned password from sponsoring organization's system administrator into a text box 145. When the user is satisfied with the entries in box 143 and box 145 the user presses a Login button 147. When the correct login ID and password are entered correctly the user is directed to their specific personal training interface screen.

FIG. 3*b* shows an interface screen for a user specific personal training plan utilizing an education competency and compliance management system. A computer program product delivered to users is represented by a user specific personal training plan screen 149. The feature descriptions that follow illustrate the comprehensive approach to improve the user experience and simplify education compliance tasks. The screen 149 has a navigation option collection on the left of the screen in an area 151. The options in the area 151 are navigation hot spots; a user can just select or click over an options to navigate to the respective screen for the specific option. A brief description of the options available follows;

My Dashboard—This is the home page for viewing a snapshot of a user's personal training plan and schedule.

My Training Plan—This is the current training plan to maintain up-to-date with a compliance profile with selected on-line and off-line education requirements.

My Events—These are the events for which the user is currently registered.

My Credentials—This is the users list of certifications and licenses.

My Courses in Progress—This is a list of courses (both on-line and off-line education) the user has started but has not completed and passed. Once completed and passed, they will appear in the My Transcript section.

My Transcript—This is a list of the courses and tests the user has completed.

Event Calendar—These are the events currently planned for the organization. This is where users register for events.

My Personal Settings—This is where the user can view their demographic information, personal settings, and manage their "Forgotten Password Question and Answer."

Change Password—Self explanatory.

Courses, Tests, and Surveys—Provides a complete list of all courses, tests, and surveys available to the user (additional to the organization training plan).

The simplicity of area 151 combined with the multitude of choices further demonstrate the comprehensiveness of the education competency and compliance management method, system, and computer product. To further simplify the user interface screen 149 has a navigation bar 153 that contains hot areas of recently used screens. A user can simply mouse click the title of the screen that the user desires to return to. A title bar 155 informs the user that they are viewing personal training plan for "user name inserted here". An "Edit Instructions" hot spot 157 allows administrators to make changes to the present page instructions. A required course name title bar 159 lists the courses (not shown but additionally included are tests, survey, licensing, and certification of skills) the user is required to complete. An expires date is associated with bar 159 courses where appropriate. The CPU 125 (FIG. 2) will track expiration dates and through selectable choices of lead times alert the individual and administrators with scheduled alert by email and through on screen, attention getting notices. An "expires soon" warning or "expired" is displayed when a user is required to update or recertify a required course. Returning to FIG. 3*b* the attention getting notices (though not shown) can be in selectable color, font, or print type. A status column is also associated with bar 159 courses. An actions column is additionally associated with bar 159 courses. The hot spot 157 allows administrators to make changes to the present page instructions.

Figure 3C:
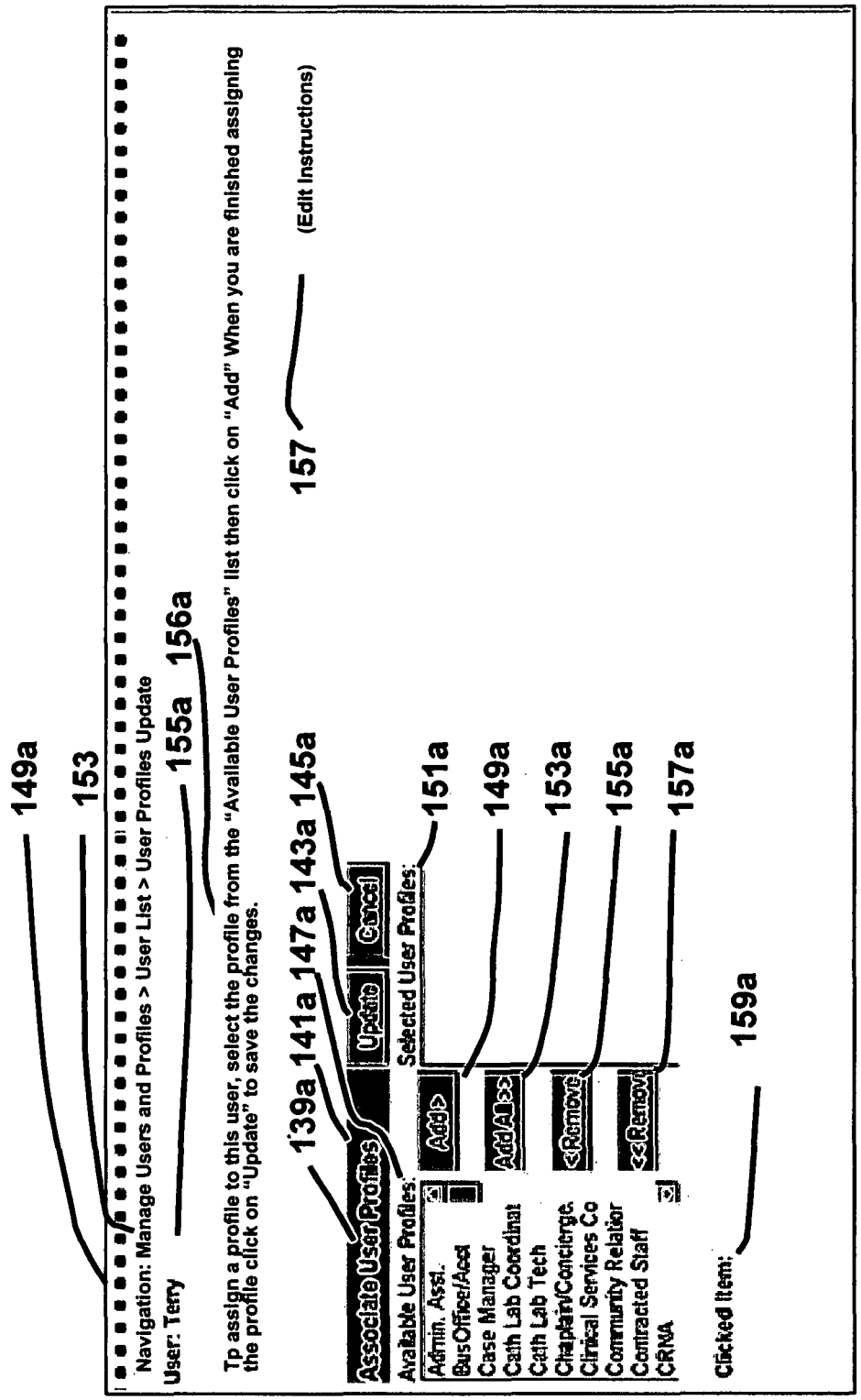
FIG. 3c shows an administrators' interface screen for associating user profiles.

FIG. 3*c* shows an administrators' interface screen for associating user profiles. A computer program product delivered to users is represented by an interface screen 149*a*. The comprehensive system design implementing the present invention is illustrated in a screen 149*a* which facilitates an administrators' set up for user profiles. By setting up user profiles employees with similar functions can be grouped into a profile and through a simple group functional assignment and can use the same training plan. This ability to group similarly functional employees by roles greatly simplifies management of education and compliance management. Additionally, to improve administrators' flexibility employees can be assigned multiple profiles. Further if requirements overlap (such as where the same requirements exist in an employee's profile) the CPU 125 (FIG. 2) will delete redundancies. Returning to FIG. 3*c* the familiar navigation bar 153 is towards the top of screen 149*a*. Though not shown in this figure the navigation area 151 is included with screen 149*a*. A User title 155*a* displays the administration user that has accessed this screen 149*a*. An instruction bar 156*a* reminds users how to use the functionality of the profile association selectors below. Immediately below bar 156*a* is associate user profiles title 139*a*. Immediately below bar 156*a* is "available user profiles" 141*a*. Contained in profiles 141*a* is a complete list of the organizations profiles administrators can select the profile role the employee is assigned to by the following actions; pressing add button 149*a* which will place the selected profile in the selected user profiles 151*a*, when multiple profiles are selected pressing the add all button 153*a* which will place the multiple profiles into profiles 151*a*, when a profile is no longer appropriate or was selected incorrectly pressing remove button 155*a*, when all profiles are to be removed the administrator can press remove all button 157*a* (double <<). If specific instructions require editing the spot 157 allows administrators to make changes to the present page instructions. Additionally, profiles can be assigned by administrators to groups of employees by department or job code. When an administrator is satisfied with the associated user profiles currently selected on screen 149*a* pressing an update button 143*a* will update the organizations records. When an administrator is not satisfied with the associated user profiles currently selected on screen 149*a* pressing a cancel button 145*a* will remove the attempted profiles from entry to the organizations records. The area adjoining clicked item 159*a* will display the currently selected profile.

Figure 4:
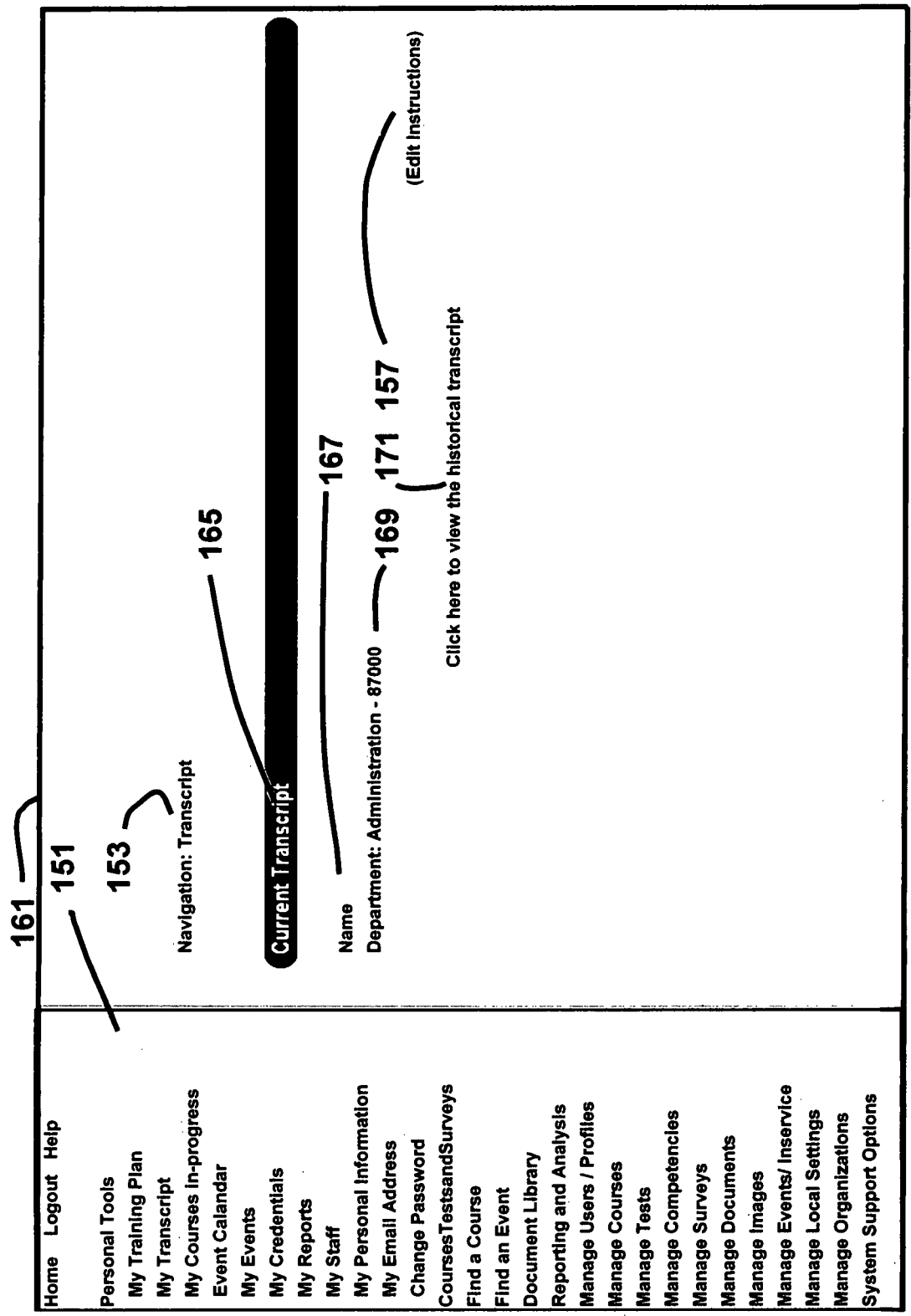
FIG. 4 shows an interface screen for an employee transcript utilizing an education competency and compliance management system.

FIG. 4 shows an interface screen for an employee transcript utilizing an education competency and compliance management system. A computer program product delivered to users is represented by a transcript interface screen 161. This screen 161 will be displayed to a user (or an administrator) after login and pressing hot area My Transcript in navigation area 151. The navigation bar 153 shows "transcript" as the present location for the user. A title bar 165 display "current transcript" to inform the user of the subject of the transcript interface screen 161. Immediately below bar 165 is name area 167 here the user name will be displayed. Immediately below are 167 is department area 169 here the department will be displayed, in this case the department is administration—87000. A view of a historical transcript is available by clicking on area 171 letters. The historical transcript will typically contain everything that has been entered into an individual's transcript to date while the transcript 165 contains only the last 24 months of an individual transcript records. The spot 157 allows administrators to make changes to the present page instructions. The simplicity of screen 161 further displays the robustness of the present invention.

FIG. 5*a* shows an interface screen for course selection with an education competency and compliance management system. A computer program product delivered to users is represented by a course selection screen 177. The robustness of the education competency and compliance management method, system, and computer product is exhibited by the user choices for course selection (from both on-line and off-line education courses) and identification provided on the screen 177. The navigation bar 153 shows the most recent navigation selection to be course list. A screen title area 179 displays "Course List". An area immediately below area 179 is a subject area 181 displaying "Find Course". To the right on area 181 are two buttons; a search button 195 to seek courses and a reset button 185 to allow users to navigate course selection. Though not shown in this figure the navigation area 151 is included with screen 177. If specific page information requires editing the spot 157 allows administrators to make changes to the present page instructions. Immediately below area 181 on the left of the screen is a course name header with a text box 193 to the right with a drop down arrow for simplified searching and course selection. When a user selects a course the name of the course is displayed in the text box 193. A user can also select a course category for aide in finding the appropriate course. The title area course category has a text box 191 to the right with a drop down arrow to aide the user in course category selection. The user merely selects the drop down arrow in box 191 and a list of course categories is displayed for user selection. A title area course subject is also provided for users to approach course selection by subject area A text box 189 to the right of course subject also features a drop down arrow to enable users to view a list of course subjects and select the appropriate subject. A title area course format is also provided for users to approach course selection by format. A text box 187 to the right of course format also features a drop down arrow to enable users to view a list of course formats for user course selection. Additionally, an area titled course product ID is provided with a text box 186 to the right. The box 186 will display the course product ID of the courses selected by the user for proper identification. Immediately below box 186 is an alternative course selection tool with a navigation area 173. Within area 173 a user can navigate back and forth or select the appropriate number or letter in the title of a course. Immediately below area 173 is an area 183 that provides a complete list of all the organization's courses with name, subject, format, ID, and action status for the user. The navigation area 173 will pre-select the portion of the courses displayed in area 183. Users can also select courses (by clicking their mouse over the course) directly from the list in area 183 for course selection.

Figure 5B:
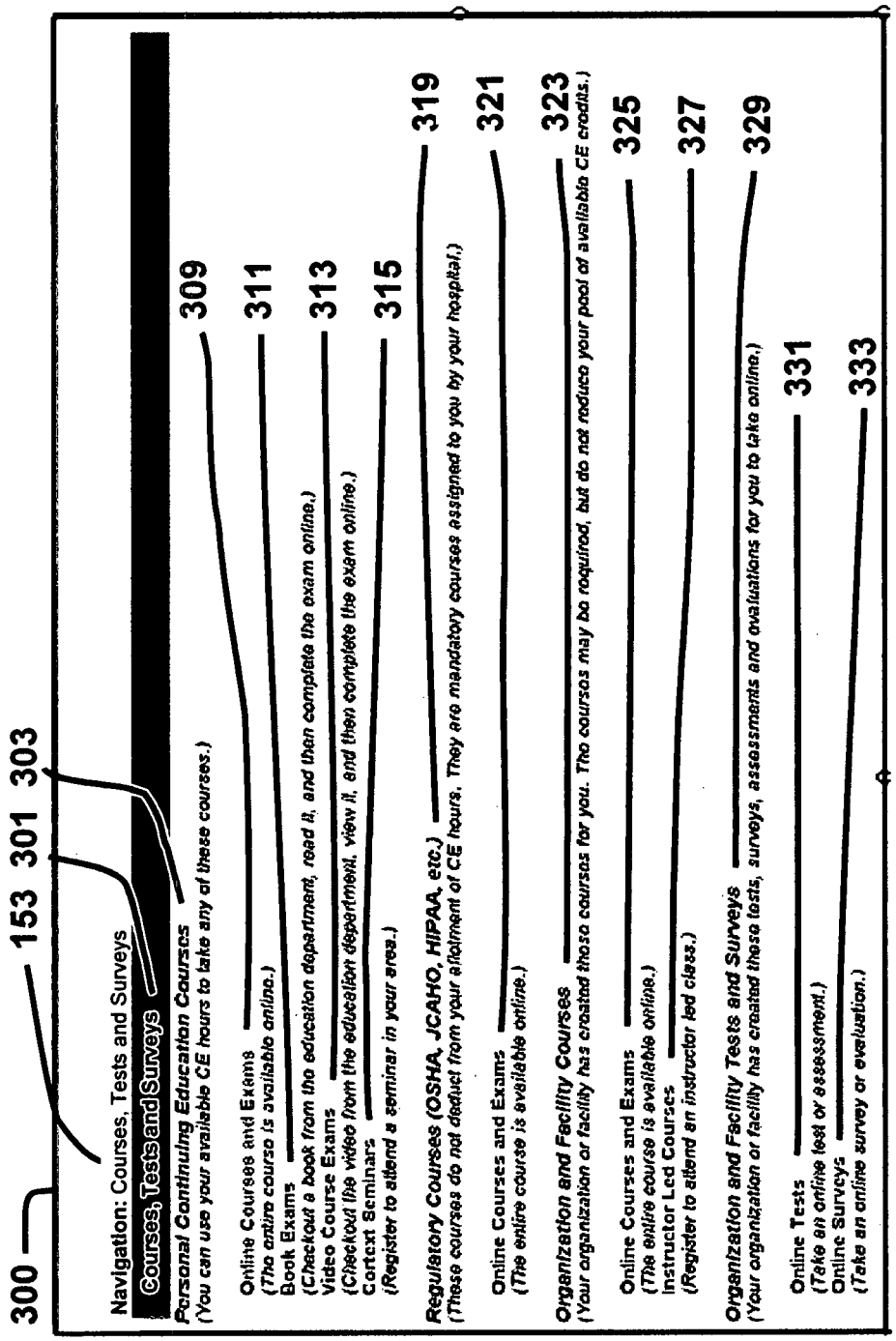
FIG. 5b shows a courses, tests, and surveys interface screen.

FIG. 5*b* shows a courses, tests, and surveys interface screen. A computer program product delivered to users is represented by a courses, tests, and surveys interface screen 300. The robustness of the education competency and compliance management method, system, and computer product is exhibited by the administrator selected entries for user choices consisting of courses, tests, and surveys functionality provided on the screen 300. Administrators can by organizational grouping define the courses, tests, and surveys and additionally include individual specific items. The navigation bar 153 shows the most recent navigation selection to be courses, tests, and surveys. Though not shown in this figure the navigation area 151 is included with screen 300. The screen title an area 301 displays "Courses, Tests and Surveys". Immediately below area 301 is an area 303 displaying "Personal Continuing Education Courses" with explanatory note (you can use your available CE hours to take any of these courses). Below area 303 is an area 309 displaying "Online Courses and Exams"; this area features enabled text and selecting the text displayed will launch the browser to the education online courses and exams screen for review and selection. Below area 309 are the instructions for area 309 (the entire course is available online). Continuing downward the next is an area 311 displaying "Book Exams" (usually prepared for off-line); this area features enabled text and selecting the text displayed will launch the browser to the book exams screen. Below area 311 are instructions for area 311 (checkout a book from the education department, read it, and then complete the exam online). Continuing further downward the next is an area 313 displaying "Video Course Exams"; this area features enabled text and selecting the text displayed will launch the browser to the video course exam screen. Below area 313 are instructions for area 313 (Checkout the video from the education department, view it, and then complete the exam online). Continuing further downward the next is an area 315 displaying "Cortext Seminars"; this area features enabled text and selecting the text displayed will launch the browser to the cortext seminar screen for a list and location of seminars. Below area 315 are instructions for area 315 (Register to attend a seminar in your area). The next major heading below area 315 is an area 319 displaying "Regulatory Courses (OSHA, JCAHO, HIPPA, etc.)". Below area 319 are instruction for area 319 (Your organization or facility has created these course for you. The courses may be required, but do not reduce your pool of available CE credits.). Continuing downward the next is an area 321 displaying "Online Courses and Exams"; this area features enabled text and selecting the text displayed will launch the browser to the regulatory online courses and exams screen. Below area 321 are instructions for area 321 (The entire course is available online). Continuing downward the next is an area 323 displaying "Organization and Facility Courses". Below are 323 are instruction for area 323 (Your organization or facility has created these course for you. The courses may be required, but do not reduce your pool of available CE credits.). Continuing downward the next is an area 325 displaying "Online Courses and Exams"; this area features enabled text and selecting the text displayed will launch the browser to the organization online courses and exams. Below area 325 are instructions for area 325 (the entire course is available online.). Continuing downward the next is an area 327 displaying "Instructor Led Course"; this area features enabled text and selecting the text displayed will launch the browser to the instructor led course schedule. Below area 327 are instructions for area 327 (Register to attend an instructor led class.). Continuing further downward a major heading in an area 329 displays "Organization and Facility Tests and Surveys". Below area 329 are instructions for area 329 (Your organization or facility has created these tests, surveys, assessments and evaluations for you to take online.). Continuing downward the next is an area 331 displaying "Online Tests"; this area features enabled text and selecting the text displayed will launch the browser to the organization online tests and surveys. Below area 331 are instructions for area 331 (Take an online test or assessment.). Continuing downward the next is an area 333 displaying "Online Surveys"; this area features enabled text and selecting the text displayed will launch the browser to the organization online surveys. Below area 333 are instructions for area 333 (take an online survey or evaluation.).

FIG. 5c shows a course add interface screen. A computer program product delivered to users is represented by a course add interface screen 400. The robustness and simplicity of the education competency and compliance management method, system, and computer product is exhibited by the user choices for administrators in screen 400. The previously complicated administration task of adding, creating, modifying, or "bringing in" courses and content is simplified on screen 400. The navigation bar 153 shows the most recent navigation selection to be, "course add". Instructions immediately below bar 153 instruct the administrator to complete the required information and click "Add" to save the entered information. Additional instructions below the present instructions explain how required fields are highlighted and flagged with a red asterisk (no color shown in example). A title area 401 displays the screen 400 function "add course". To the right of area 401 is a button 403 titled "add". The button 403 will be used by the administrator when the course information to be entered is complete. Farther to the right of area 401 is a button 405 titled "cancel". The button 405 will be used by the administrator when the course information entered is to be discarded. If specific page information requires editing the spot 157 allows administrators to make changes to the present page instructions. Though not shown in this figure the navigation area 151 is included with screen 400. Below area 401 is a comprehensive list of the elements of a course to be added, created, modified or brought in. The elements include course name, course subtitle, course category which has a drop down list to the right that facilitates category identification and selection, course subject which also has a drop down list to the right to facilitate subject identification and selection, course description with a fill in area to the right where the administrator will describe the course, course objectives with a fill in area to the right where the administrator will articulate the course objectives, course instructions with a fill in area to the right where the administrator will enter the course instructions, course product ID with a fill in area to the right for the administrator to enter the corresponding ID product code, course version with a fill in area for the administrator to enter the version of the course, credit hours with a fill in area to the right for the administrator to enter (where appropriate) the number of continuing education hours for the course, contact hours with an area to the right to enter the value of the contact hours for the course, pre-course test with a drop down box to the right to select any pre-test that may be required for the course, post course test with a drop down box to the right to select the type of post course test required, survey with a drop down box to the right to select the type of survey required to complete the course, minimum user type with a drop down box to the right to select the course minimum user type, allow testing out with a check box to the right where the administrator can by selecting allow student to challenge the present course by testing without completing the course, test out score with a box for the administrator to enter the minimum score acceptable if the student is to test out, course view before test? has a check box where the administrator can select if the student can view the course prior to taking the test in a test out situation, show users? has a check box where the administrator can elect to show users the course, compliance frequency has a drop down box where the administrator can select the frequency of the retesting for compliance for the course. The buttons 403 and 405 are duplicated in a bottom area 407 for administrators' convenience.

Figure 6:
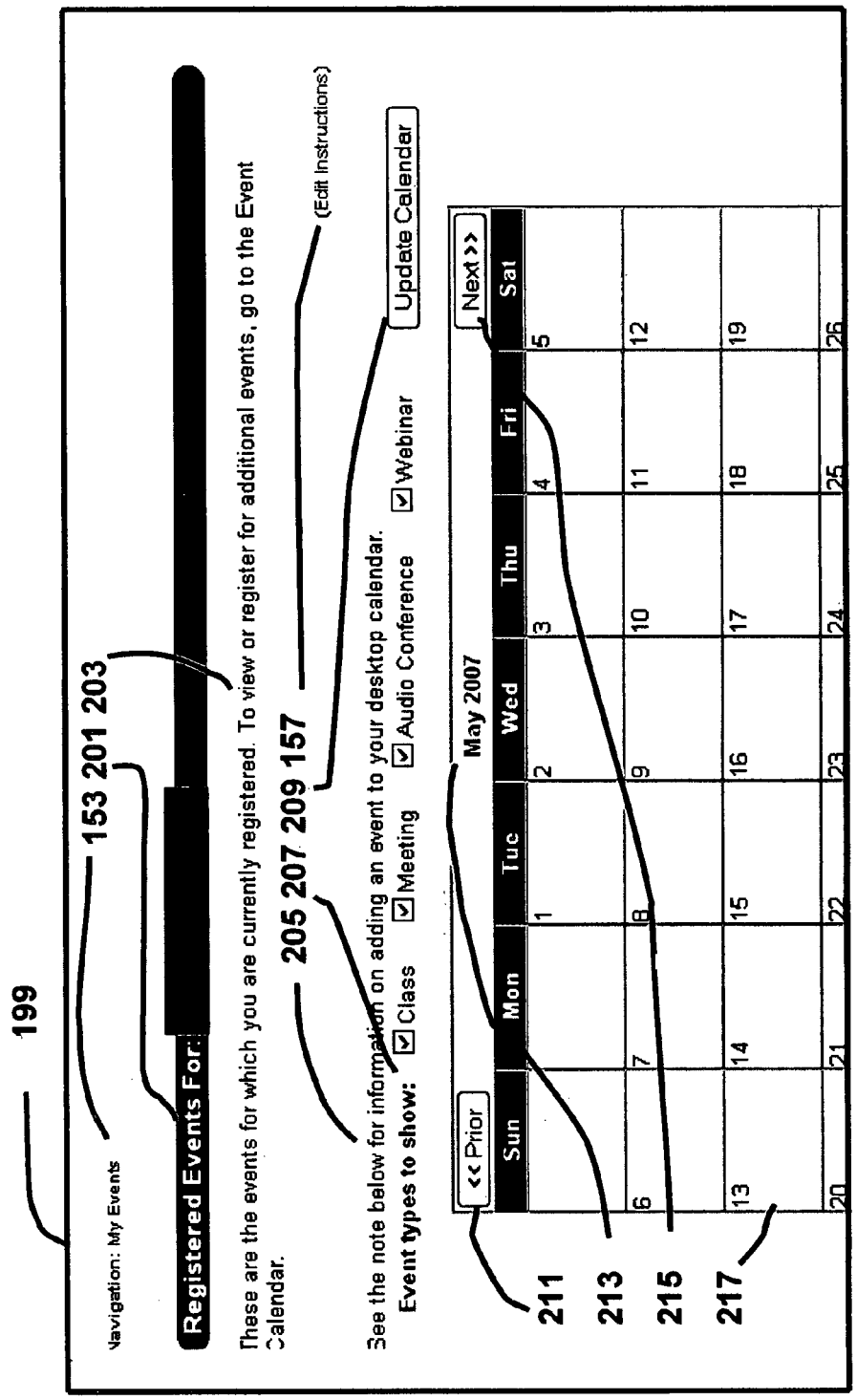
FIG. 6 shows an event calendar interface screen for scheduling and reviewing events.

FIG. 6 shows an event calendar interface screen for scheduling and reviewing events. A computer program product delivered to users and administrators is represented by a calendar/my events interface screen 199. The robustness of the education competency and compliance management method, system, and computer product is exhibited by the user choices for scheduling and tracking calendar events on a my events interface screen 199. The displayed required events are generated from the administrator grouping of an individual, individual specific items by administration, and items desired by the individual for advancement and enrichment. The navigation bar 153 shows the most recent navigation selection to be My Events. Though not shown in this figure the navigation area 151 is included with screen 199. Immediately below bar 153 is a screen title area 201 displaying "Registered Events for: user name here". The user name has been omitted for discussion purposes. The system will display the events selected for the user name that has logged into the system. Below area 201 is an area 203 with instructions "These are the events for which you are currently registered. To view or register for additional events, go to the Event Calendar". Further down screen 199 is an area 205 with the instructions "See the note below for information on adding an event to your desktop calendar". Below area 205 is a collection of option buttons following the instruction "Event types to show". There are a total of 4 option buttons titled Class, Meeting, Audio Conference, and Webinar. When a user desires to see any or all of these options the user selects the desired options with a mouse click over the option button and the respective Class, Meeting, Audio conference, or Webinar for the period will be displayed. The user selectable display ability to summarize with everything or focus through the clutter with less display further exhibits the comprehensiveness of the education competency and compliance management method, system, and computer product. To the right of area 207 is an update button 209 that allows a user to update the current calendar. Just above button 209 is the spot 157 allows administrators to make changes to the present page instructions. The display metaphor of my events is a calendar 217 the currently selected month is displayed in an area 213, the current example displays "May 2007". The user has a simple task to review past events by selecting a button 211 titled "<< Prior". If the user wishes to view future commitments a button 215 titled "Next >>"

FIG. 7 shows an interface screen with a course testing module as part of an education competency and compliance management system. A computer program product delivered to users is represented by a course testing module interface screen 219. The robustness of the education competency and compliance management method, system, and computer product is exhibited by the simplicity and directness of screen 219. Though not shown in this figure the navigation area 151 is included with screen 219. The top of screen 219 has a title are 221 displaying "Chemical Safety". The content and types of questions presented to the user being tested will vary with the specific area under test. Typical of one type of question is the multiple choice shown in area 223. In area 223 the test taking user selects the most correct answer by selecting the corresponding option button from four option buttons under the respective question. A second type of question for the test taking user is true or false shown in area 225. In area 225 the test taking user selects the true or false option button as appropriate to the question. Other questions on the page are of similar format with other parts of the chemical safety information that the users must be aware of for personal and institutional safety. Administrators can add, delete or maintain tests to keep an organization current with regulations. To minimize memorization questions can be randomized, remediated, and the administrator can select to show the student the score or not show the score depending on the specific test requirements.

Figure 8:
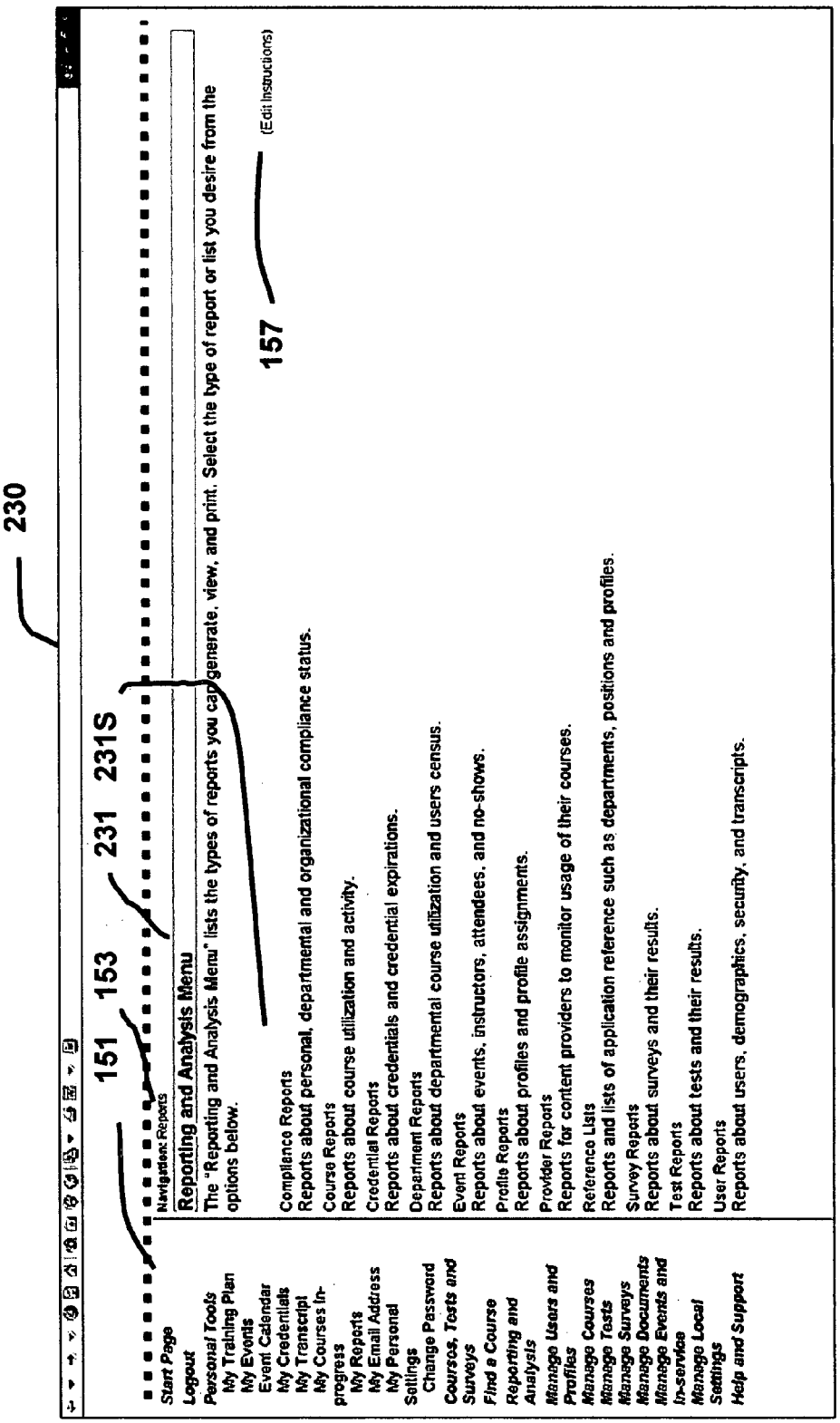
FIG. 8 shows an interface screen with a report and analysis selection choices as part of an education competency and compliance management system.

FIG. 8 shows an interface screen with a report and analysis selection choices as part of an education competency and compliance management system. A computer program product delivered to users is represented by a report interface screen 230. The robustness of the education competency and compliance management (ECCM) method, system, and computer product is exhibited by the user choices for reports and functionality provided on the screen 230. The navigation bar 153 shows the most recent navigation selection to be reports. Shown on the right of screen 230 is the navigation area 151. If specific report page information requires editing the spot 157 allows administrators to make changes to the present page instructions. Below bar 153 is a screen title area 231 displaying "Reporting and Analysis Menu". Immediately below area 231 are instructions "The "Reporting and Analysis Menu" lists the types of reports that can be generated, view, and print. Select the type of report or list you desire from the options below". The options in area 231S are enabled text and selecting the text displayed will launch the browser to the respective area. The report options include Compliance Reports which are reports about personal, departmental, and organizational compliance status, Course Reports which are reports about course utilization and activity, Credential Reports which are reports about credentials and credential reporting, Department Reports which are reports about departmental course utilization and users census, Event Reports which are reports about events, instructors, attendees, and no-shows, Profile Reports which are reports about profiles and profile assignments, Provider Reports which are reports for content providers to monitor usage of their courses, Reference Lists which are reports and lists of application reference such as departments, positions, and profiles, Survey Reports which are reports about surveys and their results, Test Reports which are reports about tests and their results, User Reports which are about users, demographics, security, and transcripts. Through this simple interface screen 230 has the ability to automatically report education activities such as continuing education to accrediting bodies. In many states third party clearing houses have been contracted by the state accrediting organization. One such example is the state of Florida. The Florida Board of Nursing has engaged an agency as a broker to act as its clearing house. If CE credit is given which can be applied to renewing a nursing license in Florida, it must be reported to the broker. When instructed ECCM automatically reports CE credit completed to the broker. This automated process can be completed by the ECCM for any accrediting body. Additionally, the ECCM can act as the clearing house for accrediting bodies directly. An accrediting body need only subscribe to the ECCM provider for reporting services.

FIG. 9 shows an interface screen with a report selection format as part of an education competency and compliance management system. A computer program product delivered to users is represented by a compliance reports, content interface screen 247. The robustness of the education competency and compliance management method, system, and computer product is exhibited by the user choices for report content and functionality provided on the screen 247. The navigation bar 153 shows the most recent navigation selection to be contents. Shown on the right of screen 247 is the navigation area 151. As shown in bar 153 the area of reports is compliance reports and contents. The contents of the report will be selected by the user from screen 247. Immediately below bar 153 is a screen title area 241 displaying "Course Compliance". Below area 241 is an area 243 with instructions for the user (List the compliance status for courses based on user profiles). Below area 243 is an area 245 that contains instructions for the simple to use interface (Please select any optional fields for your report and click "Submit".). Below area 245 is an area 249 displaying "Report Contents" on the left of the screen 247. To the right of area 249 is a button 259 displaying "Submit". At the bottom of screen 247 is an area 2491 with a duplicate button 259 displaying "Submit". The report contents are selected from area 251 displaying "Default Report Fields:". Specifically to the right of area 251 is an area 253 with a list of options to be included as defaults in the intended report. These options include: User Name, Course, Test Pass Date, Expire Date, Taken?, Expired?, Passed?, and Score. The desired options will be selected by the user desiring the report with a mouse click over the option and when all default report fields are selected the user will press the button 259 to submit the desired default report fields for storage and printing. Additionally, there is an area 255 displaying "Optional Report Fields". This area allows additional options for the user to include in a report. Specifically, four option buttons are included for user selection these options are shown in area 257. These options include Badge Number, Hire Date, Position, and Department. When a user desires to include this information in a report the selection of the appropriate option button by mouse selection and button 259 when all options are selected will submit the desired optional report fields for storage and printing. While great details and examples of the education competency and compliance management system relating to the medical profession have been offered this is for explanatory purposes and should not be considered limiting. The education competency and compliance management system can be easily adapted to any institution or organization that seeks or requires multi level (individuals, organization, and staff) compliance or certification through educational activities. This will apply to most professions ranging from legal to mechanical. Certifying organizations can range from specialized hospital organizations such as the Joint Commission Accrediting Healthcare Organizations to Occupational Safety and Health Agency and International Standards Organization.

Operation

To operate the education competency and compliance management system an organization should open an account with the services provider as shown in FIG. 2. When the services provider system administrator and the sponsoring organization's system administrator have established content, organizational roles, and employee lists the individual employee's can log on to the education competency and compliance management system. Referring to FIG. 3;

To access the system:
Open your internet browser and go to the web address provided,
Select your employer from the list of participating employers,
Enter you Login ID box 145 and password box 145,
Click the "Login" button 147.

General Navigation

Navigation is made simple in the education competency and compliance management system by use of a navigation bar at the top of each page. This navigation bar shows the user where they are in the system and the path they took to get there. The FIG. 3c navigation bar 153 shows the path an administrator took to get to the Associate User Profile page while setting up a new user.

On pages where users must search for an item such as a specific user or course, users may quickly narrow the search by selecting the first character of the search criteria either above or below the search window. Letters or numbers that contain at least one item will be in red.

FIG. 3b shows a personal training plan for a specific organizational role that an employee is assigned. FIG. 3c shows the ease that a profile of an individual within an organization can be updated by the individual or administrator. FIG. 4 shows the simplicity of accessing an individual's transcript for authorized individuals. FIG. 5 shows the breath and flexibility of course list access for individuals and administrators. FIG. 5b shows the robustness of the education competency and compliance management method, system, and computer product is exhibited by the user choices for courses, tests, and surveys functionality provided on the screen 300. FIG. 6 shows an event calendar interface screen for scheduling and reviewing events. The flexibility and ease of entry, tracking, and updating provide a user satisfying experience. FIG. 7 shows a Chemical Safety test that can be accessed and completed by students. FIG. 8 shows the initial report generation interface screen. The "Reporting and Analysis Menu" lists the types of reports you can generate, view, and print. For each report type, there are several options provided for tailoring the report to specific needs. Organizations and institutions can import their logos in addition to their preferred look and feel of report formats to enhance compliance and operations.

Compliance Reports assist in analyzing personal, departmental, and organizational compliance status.
Course Reports assist in analyzing course utilization and activity.
Credential Reports assist in tracking credentials and credential expirations in your organization.
Department Reports assist in analyzing departmental course utilization and users census.
Event Reports assist in managing events, instructors, attendees, and no-shows.
Reference Lists show application references such as departments, positions, and profiles.
Survey Reports show surveys and their results.
Test Reports show tests and their results.
User Reports track users, demographics, security, and transcripts.

Administrators can seamlessly import and implement content for their organization's operation and training. Institutions and organizations can import existing employee data bases and be operating in very short order. Report updates can be saved to my reports (FIG. 9) and data are carried forward for future reporting with the minimum amount of effort by an administrator. Employees, administrators, and other authorized personnel with the proper ID and password may access the education competency and compliance management system from any internet enabled browser facilitating planning, learning, testing, and reporting as needed for busy professionals.

DESCRIPTION OF THE PREFERRED EMBODIMENT(S)

In the preferred embodiment the education competency and compliance management system will be configured as depicted in FIG. 1 with computer support hardware as shown in FIG. 2. The user viewable computer product of the education competency and compliance management system will be represented by FIG. 3a through FIG. 9 with various navigation and display variations to accommodate user requirements. Although every permutation of the education competency and compliance management system has not been shown in this disclosure the representative Figures should give the reader the understanding how the education competency and compliance management system improves an organization's handling of competency and compliance management.

What is claimed is:
1. A method for facilitating compliance to organizational education competency requirements, comprising:
storing, in a memory coupled to a host computer system, on-line or off-line education course content for one or more sponsoring organizations,
providing, by the host computer system, secure access of education course content to users in at least one of the sponsoring organizations over a network connection;
providing assignment of varying levels of access to the host computer system to users within the at least one sponsoring organization, wherein the levels of access to the host computer system comprise a content provider level of access, a student user level of access, an instructor level of access, an organization administrator level of access, and a supervisor/manager level of access,
  wherein the content provider level of access provides content providers with the capability to deliver content to the host computer system,
  wherein the instructor level of access provides an instructor with the capability to follow course content and administer tests to student users,
  wherein the organization administrator level of access provides an organization administrator with the capability to oversee the implementation of the education competency and compliance management operation, set and adjust goals, generate compliance reports, and interface to one or more certifying organizations on behalf of the sponsoring organization;
  wherein the supervisor/manager level of access provides a supervisor/manager of one or more student users with the capability to adapt and manipulate content that is to be provided from the host computer system to student users that the supervisor/manager supervises;
transmitting, by the host computer system, to the at least one sponsoring organization on-line or off-line education course content,
receiving, by the host computer system, from the at least one sponsoring organization, one or more modifications of the on-line or off-line education course content for local content modification, wherein the local content modification comprises at least one sponsoring organization-specific modification or at least one region-specific modification;
receiving, by the host computer system, from at least one supervisor/manager in the sponsoring organization, one or more adaptations of course content to be delivered to student users that the supervisor/manager supervises;
providing one or more users in the at least one sponsoring organization selectable access to on-line and off-line education course content;
student selection of on-line and off-line education courses and testing adjustable for personal schedule needs and development;
providing one or more on-line or off-line education courses based at least in part on the on-line or off-line education course content;
providing, by the host computer system, one or more on-line or off-line tests based at least in part on the on-line or off-line education course content;
scoring, by the host computer system, student performance on at least a portion of at least one on-line or off-line tests;
storing results of at least one of the on-line or off-line tests; and
providing, by the host computer system, on-line or off-line education course feedback in testing to the at least one sponsoring organization.

2. The method of claim 1, further comprising storing on-line and off-line education course content, course modules, and course testing results in an industry standard compatible data base format for ease of reporting and compatibility.

3. The method of claim 1, further comprising analyzing on-line and off-line education course content, test performance, and feedback allowing an organization to identify performance trends and education course content relevancy.

4. The method of claim 1, further comprising student feedback of performance on on-line and off-line education courses in statistical and summary fashion.

5. The method of claim 1, further comprising data mining and reporting to accrediting bodies of student performance on on-line and off-line education courses.

6. The method of claim 1, further comprising establishing, for at least one of the sponsoring organizations, employee groupings into organizational roles.

7. The method of claim 1, further comprising providing, by the host computer system, practice testing for one or more users of the at least one sponsoring organization.

8. The method of claim 1, further comprising rating, by the host computer system, student performance in on-line and off-line education course testing.

9. The method of claim 1, further comprising providing, by the host computer system, scoring of the organizational compliance performance.

10. The method of claim 1, further comprising:
providing, by the host computer system, to at least one of the sponsoring organizations, scoring of organizational compliance performance; and
reporting, by the host computer system, organizational compliance performance to one or more accrediting bodies.

11. The method of claim 1, wherein the supervisor/manager level of access provides a supervisor/manager of one or more student users with the capability for the supervisor/manager to assign profiles to the student users under the supervisor/manager's supervision.

12. The method of claim 1, wherein the supervisor/manager level of access provides a supervisor/manager of one or more student users with the capability for the supervisor/manager to schedule learning and view results for student users under the supervisor/manager's supervision.

13. The method of claim 1, wherein at least one of the supervisor/managers with supervisor/manager level access is a student.

14. The method of claim 1, wherein the host computer system allows the sponsoring organization to define one or more levels of access for one or more users of the host computer system, the method further comprising at least one sponsoring organization defining access for at least one manager in the sponsoring organization.

15. A system for facilitating compliance to organizational education competency requirements, comprising:
a processor;
a memory coupled to the processor;
the memory configured to store program instructions executable by the processor to implement:
storing on-line or off-line education course content for one or more sponsoring organizations,
providing secure access of education course content to users in at least one of the sponsoring organizations over a network connection;
providing assignment of varying levels of access to the host computer system to users within the at least one sponsoring organization, wherein the levels of access to the host computer system comprise a content provider level of access, a student user level of access, an instructor level of access, an organization administrator level of access, and a supervisor/manager level of access,
  wherein the content provider level of access provides content providers with the capability to deliver content to the host computer system,
  wherein the instructor level of access provides an instructor with the capability to follow course content and administer tests to student users,
  wherein the organization administrator level of access provides an organization administrator with the capability to oversee the implementation of the education competency and compliance management operation, set and adjust goals, generate compliance reports, and interface to one or more certifying organizations on behalf of the sponsoring organization;

wherein the supervisor/manager level of access provides a supervisor/manager of one or more student users with the capability to adapt and manipulate content that is to be provided from the host computer system to student users that the supervisor/manager supervises;

transmitting to the at least one sponsoring organization on-line or off-line education course content, receiving from the at least one sponsoring organization, one or more modifications of the on-line or off-line education course content for local content modification, wherein the local content modification comprises at least one sponsoring organization-specific modification or at least one region-specific modification;

receiving, by the host computer system, from at least one supervisor/manager in the sponsoring organization, one or more adaptations of course content to be delivered to student users that the supervisor/manager supervises;

providing one or more users in the at least one sponsoring organization selectable access to on-line and off-line education course content;

student selection of on-line and off-line education courses and testing adjustable for personal schedule needs and development;

providing one or more on-line or off-line education courses based at least in part on the on-line or off-line education course content;

providing one or more on-line or off-line tests based at least in part on the on-line or off-line education course content;

scoring student performance on at least a portion of at least one on-line or off-line tests;

storing results of at least one of the on-line or off-line tests; and providing on-line or off-line education course feedback in testing to the at least one sponsoring organization.

16. The system of claim 15, wherein the system is further configured to receive, from at least one sponsoring organization, over a network, external material, content adjustment, course retrieval, review or updating for local organization needs.

17. The system of claim 15, wherein access to on-line and off-line education course modules and content is secured with limited access to only organization approved individuals.

18. The system of claim 15, wherein the system is further configured to generate summary reports of on-line and off-line education course test performance.

19. The system of claim 15, wherein the system is configured to store course content in a standard compatible data base format.

20. The system of claim 15, wherein the system is further configured to generate and transmit reports over a network to accrediting bodies.

21. A non-transitory, computer-readable storage medium comprising program instructions stored thereon, wherein the program instructions are configured to implement:

storing on-line or off-line education course content for one or more sponsoring organizations, providing secure access of education course content to users in at least one of the sponsoring organizations over a network connection;

providing assignment of varying levels of access to the host computer system to users within the at least one sponsoring organization, wherein the levels of access to the host computer system comprise a content provider level of access, a student user level of access, an instructor level of access, an organization administrator level of access, and a supervisor/manager level of access, wherein the content provider level of access provides content providers with the capability to deliver content to the host computer system, wherein the instructor level of access provides an instructor with the capability to follow course content and administer tests to student users, wherein the organization administrator level of access provides an organization administrator with the capability to oversee the implementation of the education competency and compliance management operation, set and adjust goals, generate compliance reports, and interface to one or more certifying organizations on behalf of the sponsoring organization;

wherein the supervisor/manager level of access provides a supervisor/manager of one or more student users with the capability to adapt and manipulate content that is to be provided from the host computer system to student users that the supervisor/manager supervises;

transmitting to the at least one sponsoring organization on-line or off-line education course content, receiving from the at least one sponsoring organization, one or more modifications of the on-line or off-line education course content for local content modification, wherein the local content modification comprises at least one sponsoring organization-specific modification or at least one region-specific modification;

receiving, by the host computer system, from at least one supervisor/manager in the sponsoring organization, one or more adaptations of course content to be delivered to student users that the supervisor/manager supervises;

providing one or more users in the at least one sponsoring organization selectable access to on-line and off-line education course content;

student selection of on-line and off-line education courses and testing adjustable for personal schedule needs and development;

providing one or more on-line or off-line education courses based at least in part on the on-line or off-line education course content;

providing one or more on-line or off-line tests based at least in part on the on-line or off-line education course content;

scoring student performance on at least a portion of at least one on-line or off-line tests;

storing results of at least one of the on-line or off-line tests; and providing on-line or off-line education course feedback in testing to the at least one sponsoring organization.

* * * * *